United States Patent Office 3,167,908
Patented Feb. 2, 1965

3,167,908
ROCKET PROPELLANT SYSTEM
James W. Dale, Winchester, Mass., assignor to Monsanto Company, a corporation of Delaware
No Drawing. Original application Dec. 22, 1958, Ser. No. 781,880. Divided and this application Dec. 21, 1961, Ser. No. 161,314
10 Claims. (Cl. 60—35.4)

This invention relates to the use of a high-energy oxidizer compound in rocket propellant combinations. More particularly this invention relates to the use of the novel compound nitrosyl chlorotetrafluoride as a high-energy oxidizer in rocket propellant combinations.

Considerable research energy has been expended in an effort to find materials which will provide a high specific impulse when employed as propellants in various designs of rockets and missiles. Liquid oxygen is employed as the oxidizer with various fuels in many of the present large rocket systems. However the extreme low temperature required to handle liquid oxygen, below —360° F., creates numerous design and handling problems. Also the excessive ready-time of the rocket employing liquid oxygen precludes its effective use as a defensive weapon.

To overcome some of the limitations inherent to the liquid propellant systems, various solid propellant systems have been developed. The solid composite propellant systems have employed solid oxidants such as ammonium nitrate, potassium perchlorate, and ammonium perchlorate with various organic resin fuel-binders. The solid propellant rocket system is characterized by greater hardware simplicity than the liquid propellant system, has a high reliability, can be stored against future need relatively safely, and has a very short ready-time. However, the specific impulse of the solid propellant composition is relatively low, e.g. being of the order of from about 210 to 225 sec. for ammonium perchlorate with various fuel-binder compositions.

To provide propellant compositions having higher specific impulse the use of liquid fluorine with various fuels, as for example JP–4, ammonia, diborane, hydrazine, hydrogen, etc., has been proposed. However, since liquid fluorine must be held at temperatures below about —367° F., it is readily apparent that similar problems to those met in the use of liquid oxygen also are inherent with liquid fluorine propellant systems.

The principal object of the instant invention is to provide a novel fluorine oxidizer composition which can be employed as the oxidant in rocket propellant compositions without resorting to extreme low temperatures as required for liquid oxygen and liquid fluorine. Another object of the instant invention is to provide novel nitrosyl chlorotetrafluoride as a high-energy oxidizer together with various fuels as novel rocket propellant compositions. Other objects and advantages of this invention will be apparent to those skilled in the art from the following disclosure.

It has now been found that a new high-energy fluorine oxidizer composition, nitrosyl chlorotetrafluoride, having many of the advantages of liquid fluorine, but which is a solid at least up to temperatures of about 32° F., can be readily prepared from nitrosyl fluoride and chlorine trifluoride.

$$NOF + ClF_3 \rightarrow NOClF_4$$

Since the chlorine trifluoride is a powerful oxidizing agent the aforesaid reaction is carried out in equipment fabricated from materials which are inert to the reactant, for example some metals are passivated by the formation of a protective fluoride film which halts further reaction. Examples of particularly suitable materials are mild steel, copper, and nickel. Preferably equimolar quantities of the nitrosyl fluoride and chlorine trifluoride are reacted at from temperatures of from about 0° C. to about —80° C. and preferably from about —20° C. to about —80° C. Thus gaseous nitrosyl fluoride can be passed over, or through, the liquid chlorine trifluoride, or mixed with gaseous chlorine trifluoride and then the mixture can be cooled to effect condensation; or liquid nitrosyl fluoride can be mixed with liquid chlorine trifluoride by any suitable means and the nitrosyl chlorotetrafluoride recovered therefrom. Whereas a slight excess of either reactant can be employed and subsequently removed by a brief period of pumping at temperatures below about —20° C. and preferably at about —30° C. or lower, it is preferred that the nitrosyl fluoride be employed in a slight excess over the required equimolar quantity since its higher volatility and lower reactivity in relation to the chlorine trifluoride facilitate its removal from the nitrosyl chlorotetrafluoride product. Also since nitrosyl fluoride can be prepared without using free fluorine, it can be considered more expendable than chlorine trifluoride.

The nitrosyl chlorotetrafluoride can also be prepared by the direct reaction of nitric oxide with chlorine trifluoride at a temperature below about 0° C. and down to about —80° C., e.g. by passing the gaseous nitric oxide over the liquid chlorine trifluoride to produce the intermediate nitrosyl fluoride in situ, which intermediate then reacts with additional chlorine trifluoride to give the desired product. This series of reactions can be shown by the following equations:

$$2NO + ClF_3 \rightarrow 2NOF + ClF$$
$$NO + ClF \rightarrow NOF + \tfrac{1}{2}Cl_2$$
$$\underline{3NOF + 3ClF_3 \rightarrow 3NOClF_4}$$
$$3NO + 4ClF_3 \rightarrow 3NOClF_4 + \tfrac{1}{2}Cl_2$$

Any chlorine monofluoride, which may not be quantitatively consumed under the selected processing conditions would be readily removed along with the chlorine produced in the reaction when the product is subjected to a brief pumping operation at a temperature preferably between about —20° C. and about —35° C. Since the normal boiling points of chlorine monofluoride and chlorine are respectively about —101° C. and —34° C. it will be apparent that the nitrosyl chlorotetrafluoride can be rapidly purified over the above-mentioned temperature range. It will also be apparent that lower temperatures may be employed in the pumping operations, in which event the pumping operation must be carried out for a longer period of time to effect the substantially complete removal of the chlorine from the product.

Similarly to the above alternative, nitrosyl fluoride can be formed in situ by the reaction of nitrosyl chloride with chlorine trifluoride followed by further reaction with additional chlorine trifluoride to give the desired nitrosyl chlorotetrafluoride product, which can be purified by the removal of chlorine and any residual chlorine monofluoride as disclosed above. This series of reactions can be exemplified by the following equations:

$$NOCl + ClF_3 \rightarrow NOF + 2ClF$$
$$2NOCl + 2ClF \rightarrow 2NOF + 2Cl_2$$
$$\underline{3NOF + 3ClF_3 \rightarrow 3NOClF_4}$$
$$3NOCl + 4ClF_3 \rightarrow 3NOClF_4 + 2Cl_2$$

It is also possible to employ free fluorine in a direct reaction with nitrosyl chloride, or nitric oxide plus chlorine, whereby nitrosyl fluoride and chlorine trifluoride are formed in situ as intermediates and then condensed to form the desired nitrosyl chlorotetrafluoride.

$$NOCl + 2F_2 \rightarrow NOClF_4$$
$$2NO + Cl_2 + 4F_2 \rightarrow 2NOClF_4$$

The nitrosyl chlorotetrafluoride is a solid white compound which sublimes at a temperature of about 0° C. under normal atmospheric pressure, and the solid has a density slightly over 1.9 at 0° C. The product nitrosyl chlorotetrafluoride was found to spontaneously ignite wood and paper when contacted therewith in air. This novel composition is particularly useful as a high-energy oxidant in a rocket propellant system wherein the fuel can be materials such as ammonia, hydrazine, unsymmetrical dimethyl hydrazine, monomethyl hydrazine, and other nitrogen-rich compounds; diborane; hydrogen; hydrocarbons, and fuel compositions such as JP–4; alcohols such as methanol and ethanol; and the like. It has been found, for example, that nitrosyl chlorotetrafluoride together with ammonia provides a hypergolic combination having very high energy. Thus liquid ammonia can be vaporized and sprayed to impinge on the solid nitrosyl chlorotetrafluoride to provide a very brisk flame in a rocket motor which can be controlled by the rate at which the ammonia fuel is fed to the rocket motor.

The following examples are illustrative of the instant invention:

*Example 1*

To illustrate the utility of nitrosyl chlorotetrafluoride as a solid high-energy oxidant it was observed that when a stream of ammonia was directed against the exposed surface of the nitrosyl chlorotetrafluoride it was ignited to produce a vigorous flame. By terminating the flow of ammonia the combustion reaction ceased, but the vigorous flame was immediately reformed when the flow of ammonia was again started. It was observed that the solid oxidant remained intact between each application of ammonia. The combustion reaction in the rocket motor can be shown by the equation:

$$3NOClF_4 + 7NH_3 \rightarrow 12HF + 3HCl + 5N_2 + 3H_2O$$

from which it is seen that 10 moles of the solid/liquid propellant yields 23 moles of hot low molecular weight gases. Thus, it will be seen that this system is capable of providing a very high specific impulse to the rocket system. Additionally, this propellant system, in contradistinction to a conventional solid propellant system, is subject to control to provide flame-out at the proper time when the missile is in flight whereby the desired glide path to the target will be followed.

*Example 2*

Similarly the combustion reaction in the rocket motor employing nitrosyl chlorotetrafluoride as a solid high-energy oxidant and hydrazine as the fuel therein can be shown by the equation:

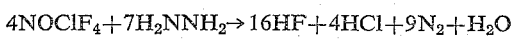

$$4NOClF_4 + 7H_2NNH_2 \rightarrow 16HF + 4HCl + 9N_2 + H_2O$$

wherein 11 moles of the solid/liquid propellant provides 33 moles of hot exhaust gases.

*Example 3*

The high-energy oxidizer, nitrosyl chlorotetrafluoride, is also hypergolic with many other fuel components. Thus, in the hydrocarbon fuel series, even the higher boiling portion of the volatile petroleum fraction, i.e. ligroin, readily bursts into flame when brought into contact with nitrosyl chlorotetrafluoride.

In a similar fashion various other fuels and fuel mixtures can be employed with the solid oxidant, nitrosyl chlorotetrafluoride, to provide the energy for propelling rockets and missiles.

From the foregoing, it is seen that the average molecular weight of the rocket exhaust gases closely approaches the low molecular weight theoretically attained with the system liquid fluorine oxidant with liquid hydrogen fuel, which system represents about the maximum specific impulse attainable for the strictly chemical combustion rocket motors. However it will be understood that the average molecular weight of the exhaust gases will be somewhat less than that indicated above, due to dissociation under the rocket motor conditions, just as the average molecular weight of the exhaust gases from the fluorine-hydrogen system is less than the theoretical hydrogen fluoride. Accordingly, it is readily seen that the rocket system employing nitrosyl chlorotetrafluoride as the oxidant therein approaches the high specific impulse of the liquid fluorine/liquid hydrogen system without the very serious disadvantages of the extreme low temperature requirements of the said liquid system.

This application is a divisional application from my copending application Serial No. 781,880, filed December 22, 1958, claiming the new compound nitrosyl chlorotetrafluorine and the process of its preparation.

I claim:

1. A method for applying immediate thrust to a rocket system comprising introducing a fluid fuel component into contact with the exposed surface of a compact mass of the solid oxidant component, nitrosyl chlorotetrafluoride, in a combustion chamber of a rocket motor to effect the spontaneous ignition of said two components, said fuel is introduced at a rate to provide sufficient thrust to the entire rocket system to launch said system, and the total supply of said oxidant is sufficient to oxidize the total supply of said fuel carried in said rocket system.

2. The method of claim 1, wherein the fuel is selected from the group consisting of ammonia, hydrazine, unsymmetrical dimethyl hydrazine, monomethyl hydrazine, hydrogen, diborane, a liquid pumpable hydrocarbon, a low molecular weight aliphatic alcohol, and mixtures thereof.

3. The method of claim 2, wherein the fuel is ammonia.

4. The method of claim 2, wherein the fuel is hydrazine.

5. The method of claim 2, wherein the fuel is unsymmetrical dimethyl hydrazine.

6. The method of claim 2, wherein the fuel is monomethyl hydrazine.

7. The method of claim 2, wherein the fuel is diborane.

8. The method of claim 2, wherein the fuel is a liquid pumpable hydrocarbon.

9. The method of claim 2, wherein the fuel is a low molecular weight aliphatic alcohol.

10. The method of claim 2, wherein the fuel is hydrogen.

No references cited.